(12) United States Patent
Zhao et al.

(10) Patent No.: US 11,054,038 B2
(45) Date of Patent: Jul. 6, 2021

(54) MECHANICAL SEAL WITH OUTER FORWARDLY-INCLINED RIM FOR LIQUIDS

(71) Applicant: AIGI Environmental Inc., Jiangsu (CN)

(72) Inventors: Jingwei Zhao, Jiangsu (CN); Jun Zhang, Jiangsu (CN)

(73) Assignee: AIGI ENVIRONMENTAL INC., Jiangsu (CN)

( * ) Notice: Subject to any disclaimer, the term of this patent is extended or adjusted under 35 U.S.C. 154(b) by 113 days.

(21) Appl. No.: 16/396,801

(22) Filed: Apr. 29, 2019

(65) Prior Publication Data

US 2020/0300369 A1    Sep. 24, 2020

(30) Foreign Application Priority Data

Mar. 20, 2019  (CN) .......................... 201910210713.3

(51) Int. Cl.
*F16J 15/34*    (2006.01)
*F16J 15/00*    (2006.01)

(52) U.S. Cl.
CPC ......... *F16J 15/3472* (2013.01); *F16J 15/002* (2013.01); *F16J 15/3452* (2013.01)

(58) Field of Classification Search
CPC .. F16J 15/3472; F16J 15/3464; F16J 15/3436; F16J 15/3452; F16J 15/00; F16J 15/002; F16J 15/006; F16J 15/162; F16J 15/40; F16J 15/067; F16J 15/188; F16J 15/3488

USPC ......................................................... 277/390
See application file for complete search history.

(56) References Cited

U.S. PATENT DOCUMENTS

| 2,015,979 | A  | * | 10/1935 | Wahlmark | ............... | F16J 15/36 |
| | | | | | | 277/375 |
| 3,836,157 | A  | * | 9/1974  | Hummer   | ............... | F16J 15/3404 |
| | | | | | | 277/366 |
| 9,546,734 | B2 | * | 1/2017  | Cid      | ............... | F16J 15/3488 |
| 2003/0122315 | A1 | * | 7/2003 | Feigl    | ............... | F16J 15/348 |
| | | | | | | 277/377 |
| 2016/0327161 | A1 | * | 11/2016 | Sato    | ............... | F16J 15/3488 |

* cited by examiner

*Primary Examiner* — Nathan Cumar
(74) *Attorney, Agent, or Firm* — Grogan, Tuccillo & Vanderleeden, LLP

(57) ABSTRACT

Disclosed is a mechanical seal with an outer forwardly-inclined rim for liquids, including a moving ring and a stationary ring; end portions of the moving ring and the stationary ring are seal end faces in mutual friction and perpendicular to the axis, for preventing the liquid at one side of the seal end faces from leaking to the other side; one of the moving ring and the stationary ring is provided with a rim at one side in contact with liquid, and the rim is protruding in its radial direction and inclined toward the other ring, so that when a transmission device runs, liquid turbulence occurs to an inclined surface of the rim, and the generated centrifugal force makes particles or impurities in the liquid distant from the seal end faces, so as to effectively prevent particles or impurities in the liquid from entering the seal end faces.

20 Claims, 6 Drawing Sheets

MECHANICAL SEAL WITH OUTER FORWARDLY-INCLINED RIM FOR LIQUIDS

FIELD

The present invention relates to the liquid mechanical seal technologies, and in particular, to a friction seal ring with two rings being closely fit to each other and perpendicular to the axis, specifically liquid mechanical seal moving and stationary rings with outer rims.

BACKGROUND

In the prior art, fluid seal is available in four types: packing seal, rubber ring seal, dry gas seal, and mechanical seal. Packing seal mainly consists of packing, a packing box and a packing fixture. The packing seal is made by pressing by the fixture to plastically deform the packing to produce a radial force to be in close contact with a shaft for sealing. The packing seal abrades the shaft, and thus a small amount of leakage occurs. The rubber ring seal is made by producing large deformation with less stress by means of the high elasticity of the rubber material. Such deformation can provide contact pressure, to compensate leakage gaps, thereby achieving the purpose of sealing. The rubber ring seal is mostly used for reciprocating hydraulic pneumatic seal or rotary oil seal with almost no pressure. The packing seal and the rubber ring seal are not mechanical seal. The mechanical seal is defined in the relevant national standards: "a fluid leakage prevention device consisting of at least one pair of end faces perpendicular to the rotation axis, which is held in fitting to each other and relatively sliding under the action of the fluid pressure and the compensating mechanism elastic force (or magnetic force) in conjunction with the auxiliary seal". The mechanical seal differs from the packing seal and the rubber ring seal in that the seal ring is made of rigid material, and thus, the elastic force or magnetic force is required to be compensated. On the contrary, the elastic or packing material cannot be designed according to the foregoing national standards because of its large resistance. The fluid mechanical seal can be divided into contact seal and non-contact seal of the seal ring. Non-contact mechanical seal is a special form of the mechanical seal, i.e., dry gas seal, which appeared in foreign countries in the late 1970s and applied to gas transportation facilities of offshore platforms, and was originally designed to solve the problem of shaft-end seal of high-speed centrifugal compressors. Unlike liquid-lubricated mechanical seal, dry gas seal produces a gas film with stable rigidity on two seal end faces, so that the two seal end faces are completely separated from each other and maintain a certain seal gap, which is only suitable for fluid media without impurities. The foregoing three types of seals, i.e., rubber seal, packing seal, and dry gas seal, are unrelated to the present invention. The rubber seal and the packing seal have gradually disappeared due to large frictional force and shaft abrasion, and are only suitable for occasions where mechanical seal cannot be used, and the dry gas seal is limited by the degree of media cleanliness and cost, and thus the use is limited. The present invention is mainly contact mechanical seal, and is a seal device for isolating the fluid in the pump body from the air outside the pump in the most common pump rotating device in the world.

In the contact mechanical seal for pumps, although the common seal ring is designed in various forms, the design of the seal ring is regular, and the common point is that the moving and stationary seal rings are flush on the side in contact with the liquid, i.e., the diameter is the same, in order to prevent impurities in the liquid from accumulating, colliding, and entering the seal surface at the contact point. However, the side in contact with the air is often not flush, because there is no problem of impurities, a design of a narrow ring and a wide ring is adopted to reduce friction, and is a reasonable design in accordance with fluid mechanics and thermodynamics. On the contrary, the mechanical seal that one end of the seal ring in contact with the liquid is not flush is often a special case, which belongs to the special media fluid seal form in the special working conditions, for example, in the Chinese patent CN107355416A, the Japanese patent JP2-80864A, and the U.S. Pat. No. 9,683,451B1, although at one end of each of the moving and stationary seal rings in contact with the liquid, one ring is higher than the other ring, the higher portion is upright, which easily causes impurity particles to be accumulated and enter the seal surface. For another example, in the Chinese patents CN205534228U, CN204692584U, and the U.S. Pat. No. 9,841,108B2, although one of the moving and stationary seal rings is higher than the other one at one side of the rings in contact with the liquid, the portion above the contact surface is not inclined, and the narrow ring is inclined, the formed V-shaped angle would cause impurities in the liquid to be accumulated more easily. For another example, in the Chinese patents CN206338413U, CN207178077U, and the Japanese patents JP2005-113983A, JP2007-139140A, although one of the moving and stationary seal rings is higher than the other one at one side of the rings in contact with the liquid, the higher portion is inclined backward, and thus cannot block large impurity particles in the liquid from entering the seal surface. The common feature of the special seal forms of these special working conditions is: they are not applicable to the fluid media containing impurities, because the problem of accumulation, collision, and entry of impurities into the seal contact surface caused by the unevenness of two rings at the side in contact with the liquid is not solved. If used in the general liquid, the entry of the impurity particles into the friction seal surface may cause abrasion of grains between the seal end faces, resulting in early failure of the sealing. Because of this, in contact mechanical seal for pumps that may carry impurity particles, the flushing of the seal surfaces on the liquid side is still the most common design.

SUMMARY

To solve the deficiencies in the existing mechanical seal technologies for liquids, the present invention provides a mechanical seal with a forwardly inclined outer rim for liquids which can effectively keep solid impurities in the liquid away from the seal end faces, thereby reducing the possibilities of impurity accumulation, collision, and entry into the seal end faces. The seal ring is provided with a protruding rim, and the rim faces toward the side where the liquid is. Turbulence occurs to the protruding inclined surface of the rim due to the relative motion of the liquid, and non-liquid impurities are discharged or away from the seal end faces along the inclined surface under the centrifugal force, so as to effectively prevent the non-liquid impurities from entering to damage and rub the surfaces of the seal ring. Addition of a protruding rim improves the strength of the seal ring, enlarges the heat radiating area of the ring body, reduces the thermal deformation caused by friction of the seal surfaces, significantly improves the liquid sealing effect, and prolongs the service life, and thus the present invention is an ideal mechanical seal for liquids.

To achieve the foregoing objective, the present invention adopts the following technical solution.

A mechanical seal with an outer forwardly-inclined rim for liquids, including a moving ring and a stationary ring, where the moving ring or the stationary ring is provided with a spring or a corrugated tube along the axis direction; the elastic force generated by the spring or the corrugated tube enables end faces of the moving ring and the stationary ring to be fit to each other and enables the end faces to be perpendicular to the axis; one side of the fitting surface of the moving ring and the stationary ring is air, and the other side is liquid; the moving ring and the stationary ring are closely fit to prevent the liquid from leaking from one side to the other side; cross-section widths of the moving ring and the stationary ring are different, causing end portions of the moving ring and the stationary ring to be partially fit; at one side of each of the moving ring and the stationary ring close to liquid, the ring with a large cross-section width is provided with a rim protruding in its radial direction, and the other ring with a narrow cross-section width is parallel to the axis, without protruding; and the protruding rim is forwardly inclined towards the ring with a narrow cross-section width.

As an optimization solution of the present invention, the rim is only disposed at an outer side of a contact surface between the moving ring and the stationary ring.

As an optimization solution of the present invention, the rim is only disposed at an inner side of a contact surface between the moving ring and the stationary ring.

As an optimization solution of the present invention, the moving ring is an integrated or split structure; and the stationary ring is an integrated or split structure.

As an optimization solution of the present invention, the inclined surface of the forwardly inclined portion of the rim close to the fitting surface is an arc-inclined, or oblique-inclined, or right-angle-inclined surface.

As an optimization solution of the present invention, the connection point of the fitting surface and the forwardly-inclined point of the rim are intersected with each other, or the distance therebetween is greater than 0.

As an optimization solution of the present invention, the inclined surface of the rim is provided with further protrusions.

As an optimization solution of the present invention, the outer section of the rim is tapered, trapezoidal, polygonal, curved, or any combination thereof.

As an optimization solution of the present invention, the material of the moving ring and the stationary ring is any one of plastic, ceramic, graphite, and metal alloy.

The beneficial effects achieved by the present invention:

(1) the moving ring rotates to drive, by means of the rim, liquid to rotate, so as to enable solid impurities in the liquid to be away from the fitting surface of the moving ring and the stationary ring, and to avoid impurities from being accumulated at a point where the contact surface of the seal ring is in contact with the media;

(2) The rim may be disposed at an outer side or an inner side of a contact surface between the moving ring and the stationary ring. The two structures have respective characteristics and may meet multiple usage scenarios;

(3) the rim blocks large solid impurities in the liquid, to avoid impurities from being accumulated at a point where the contact surface of the seal ring is in contact with the media;

(4) the rim enlarges the heat radiating area of the ring body and reduces thermal deformation; and (5) the rim appropriately reduces the friction of the seal surface, thereby prolonging the service life.

DESCRIPTION OF REFERENCE NUMERALS IN DRAWINGS

| 1 Moving ring; | 2 Stationary ring; | 3 Shaft; |
|---|---|---|
| 4 Press cover; | 5 Rim; | 6 Shell; |
| 7 Spring; | | 8 Moving ring's seal end face; |
| 9 Stationary ring's seal end face; | | 10 Shaft sleeve; |
| 11 Locking ring; | | 51 Inclined connecting line I; |
| 52 Inclined connecting line II; | | 53 Inclined connecting line III; |
| 54 Inclined connecting line IV; | | 55 Inclined connecting line V; |
| 56 Inclined connecting line VI; | | 57 Inclined connecting line VII; |
| 58 Right-angle connecting line VIII; | | 71 Corrugated tube; |
| 571 Protrusions. | | |

DETAILED DESCRIPTION

The present invention is further described below with reference to the accompanying drawings. The following embodiments are merely used for describing the technical solution of the present invention more clearly, and are not intended to limit the scope of protection of the present invention.

Embodiment 1

Figure 1:
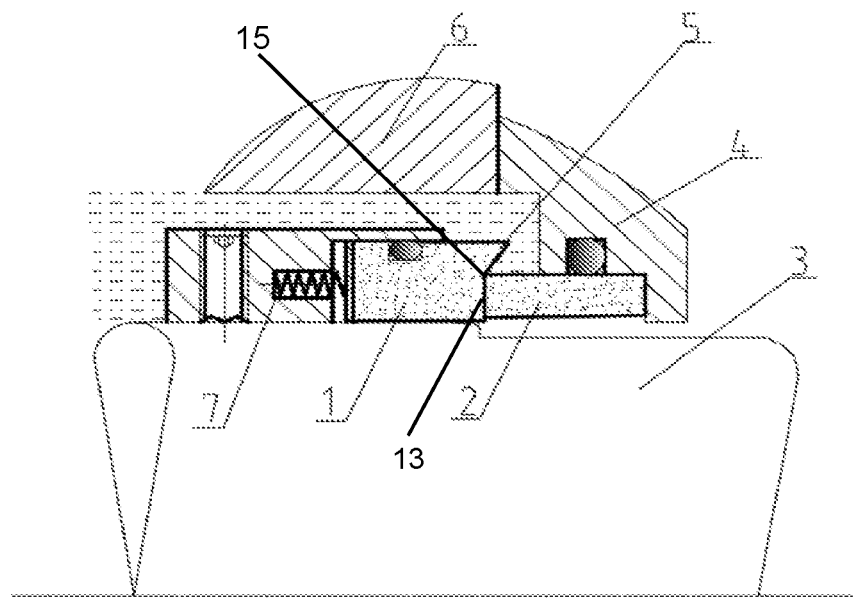
FIG. 1 is an axial sectional view of Embodiment I of the present invention in a mechanical seal application.
Figure 2:
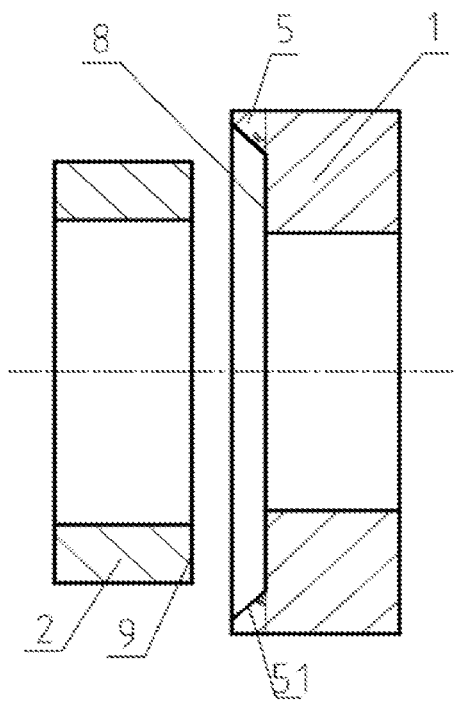
FIG. 2 is an axial sectional view of a moving ring of a large cross-section width and a stationary ring of a narrow cross-section width according to Embodiment I of the present invention.
Figure 3:
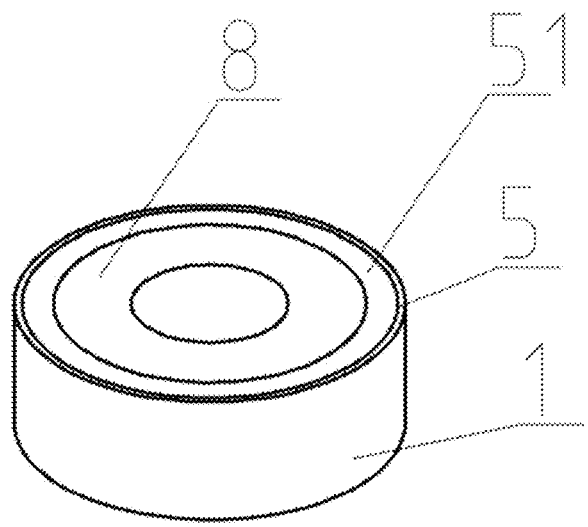
FIG. 3 is a schematic structural diagram of a moving ring with a large cross-section width according to Embodiment I of the present invention.

As shown in FIGS. 1-3, this embodiment discloses a mechanical seal with an outer forwardly-inclined rim for liquids, including a moving ring and a stationary ring, where the moving ring 1 or the stationary ring 2 is provided with a spring 7 along the axis direction, which enables seal end faces of the moving ring 1 and the stationary ring 2 to be fit to each other and perpendicular to a shaft 3; the moving ring 1 and the spring 7 are fixedly connected to the shaft 3; the stationary ring 2 and a press cover 4 are fixedly connected to a shell 6; the shaft 3 rotates relative to the shell 6; such setting can isolate liquid at one side of the seal end faces from leaking to the other side close to the shaft 3; the width of the moving ring 1 is greater than that of the stationary ring 2, and the so-called width of the ring refers to ½ of the difference between an outer diameter and an inner diameter of cross-sections of two rings. Since the widths of the two rings are different, the stationary ring's seal end face 9 and the moving ring's seal end face 8 are not completely fit; at one side of the seal end faces in contact with liquid, the moving ring 1 is provided with a rim 5, and the stationary ring 2 with small diameter does not protrude (a hollow cylindrical structure); the rim 5 partially protrudes along the axial direction of the moving ring 1 or the stationary ring 2 and is provided with an inclined surface, and an incline angle (a in FIG. 2) of the inclined surface is greater than 100. Wherein, the spring 7 can be replaced by a corrugated tube 71 shown in FIG. 11.

That is, the difference between an inner diameter of the rim and an outer diameter of a ring with a narrow width is greater than or equal to 0, and an end portion of the ring with a narrow width is not in contact with the rim.

The moving ring 1 is an integrated or split structure; and the stationary ring 2 is also an integrated or split structure. The integrated structure refers to that the moving ring 1 or the stationary ring 2 is an entirety and cannot be split. The split structure refers to that the moving ring 1 or the stationary ring 2 is detachable and is a component consisting of multiple different parts.

The rim 5 of this embodiment is forwardly inclined outside the moving ring's seal end face 8; an inclined connecting line I 51 between the inclined portion and the line perpendicular to the seal end face 8 is an oblique line; and the inclined portion of the rim 5 starts from an end point of the contact surface of the moving ring's seal end face 8 and the stationary ring's seal end face 9. The surface roughness of the contact portion of the moving ring's seal end face 8 and the stationary ring's seal end face 9 is less than 0.6 μm, and the roughness of a protruding surface of the rim 5 (the upper end of the rim) is greater than 0.6 μm. The material of the moving ring 1 and the stationary ring 2 is preferably any one of plastic, ceramic, graphite, and metal alloy.

During operation, liquid and the rim 5 are located at the same side; when two rings rotate relative to each other, the rim 5 drives the surrounding liquid to move relatively by means of the adhesive force of the rim 5 and the liquid, so that turbulence occurs to the protruding inclined surface of the rim 5; since the density of most non-liquid particles is greater than that of the liquid, non-liquid impurities are discharged or away from the seal end face along the inclined surface under the centrifugal force, so as to avoid impurities from being accumulated at a point where the contact surface of the seal ring is in contact with the media, and meanwhile, block large solid impurities in the liquid, thereby effectively preventing the non-liquid impurities from entering to damage and rub the surfaces of the seal ring. The rim 5 improves the strength of the seal ring, enlarges the heat radiating area of the ring body, reduces the thermal deformation caused by friction of the seal surfaces, significantly improves the liquid sealing effect, and prolongs the service life.

Embodiment II

Figure 4:
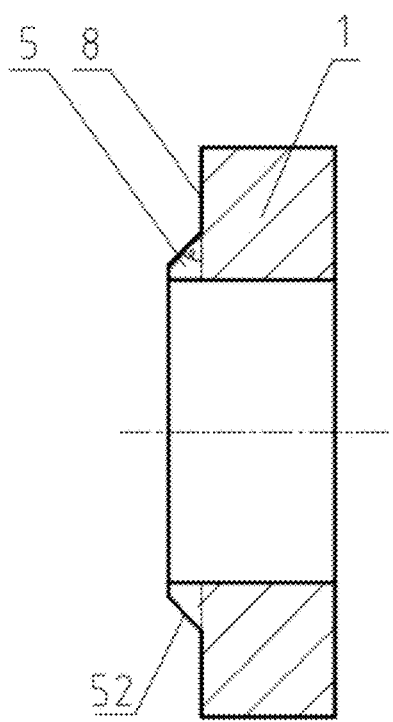
FIG. 4 is an axial sectional view of a moving ring of a large cross-section width according to Embodiment II of the present invention.

As shown in FIG. 4, this embodiment differs from Embodiment I in that: in this embodiment, liquid is located at the inner side of the contact surface of the moving ring 1 and the stationary ring 2; the rim 5 is protruded at the inner side of the moving ring's seal end face 8; the inclined angle (a in FIG. 4) of the forwardly inclined portion of the rim 5 is greater than 10°; an inclined connecting line II 52 between the inclined portion and the moving ring's seal end face 8 is an oblique line; and the outer section of the rim 5 is trapezoidal.

When the rim 5 rotates, the rim 5 drives the surrounding liquid to rotate mainly by means of the adhesive force of the rim 5 and the surrounding liquid; when the non-liquid particle flow is close to the rim 5, the rim 5 drives non-liquid particles in the liquid to rotate; when the rotating speed of the non-liquid particles is high, turbulence would occur to the liquid; the non-liquid particles forming the turbulence would easily move to the center of a pipeline; the flow velocity in the center of the pipeline is relatively fast, so as to accelerate the non-liquid particles to be away from a friction pair as soon as possible to a certain extent, avoiding the non-liquid particles entering the friction pair, and thus prolonging the service life of the mechanical seal of this embodiment.

Embodiment III

Figure 5:
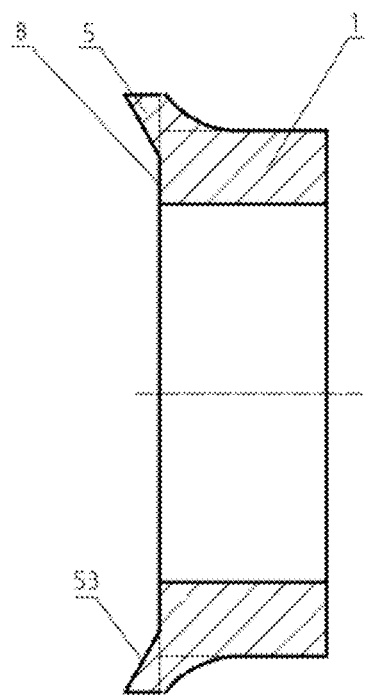
FIG. 5 is an axial sectional view of a moving ring of a large cross-section width according to Embodiment III of the present invention.

As shown in FIG. 5, this embodiment differs from Embodiment I in that: in this embodiment, the forwardly inclined portion of the rim 5 is connected to the seal end face and the outer circumferential surface of the moving ring; an inclined connecting line III 53 between the inclined portion and the line perpendicular to the seal end face is an oblique line; a connecting surface of the inclined portion to the outer circumferential surface is an arc surface; and the outer section of the rim 5 is a combination of taper and arc.

Embodiment IV

Figure 6:
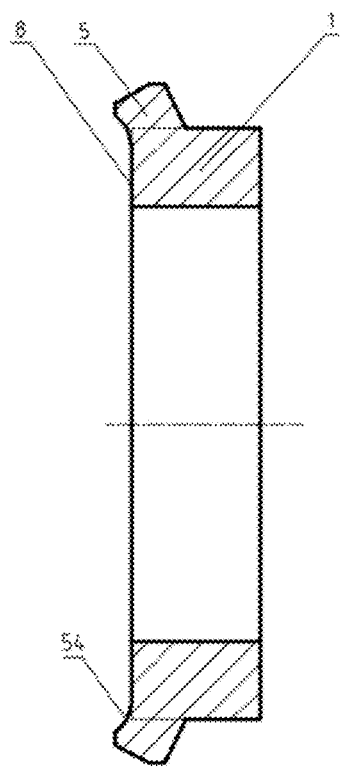
FIG. 6 is an axial sectional view of a moving ring of a large cross-section width according to Embodiment IV of the present invention.

As shown in FIG. 6, this embodiment differs from Embodiment I in that: in this embodiment, the forwardly inclined portion of the rim 5 is connected to the moving ring's seal end face 8 and the outer circumferential surface of the moving ring; an inclined connecting line IV 54 between the inclined portion and the line perpendicular to the moving ring's seal end face 8 is a combination of a camber line and an oblique line; a connecting surface of the inclined portion to the outer circumferential surface is an inclined surface; and the outer section of the forwardly inclined portion of the rim 5 is a combination of polygon and arc.

Embodiment V

Figure 7:
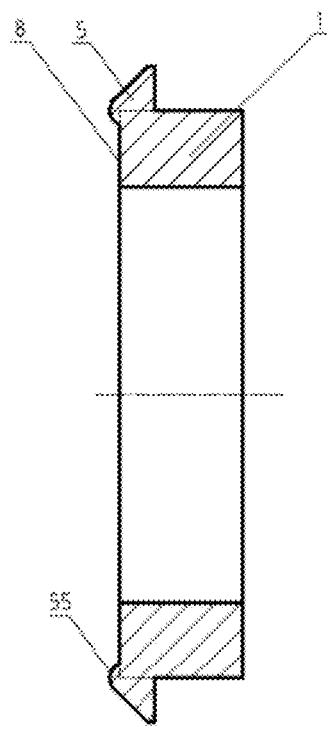
FIG. 7 is an axial sectional view of a moving ring of a large cross-section width according to Embodiment V of the present invention.

As shown in FIG. 7, this embodiment differs from Embodiment I in that: in this embodiment, the forwardly inclined portion of the rim 5 is connected to the moving ring's seal end face 8 and the outer circumferential surface of the moving ring 1; an inclined connecting line V 55 between the inclined portion and the line perpendicular to the moving ring's seal end face 8 is a combination of a camber line and an oblique line; a connecting surface of the inclined portion to the outer circumferential surface of the moving ring 1 is a vertical surface; and the outer section of the forwardly inclined portion of the rim 5 is a combination of trapezoid and arc.

Embodiment III~Embodiment V differ from Embodiment I in that: in Embodiments III-V, the diameter of the rim 5 is greater than that of the moving ring 1, which decides that compared to Embodiment I, the linear velocity of the rim 5 in this embodiment is higher, and the contact area to the external liquid is larger under the same angular velocity, and thus, the driving effect to the external liquid is better, and the effect of eliminating the non-liquid particles is better.

Embodiment VI

Figure 8:
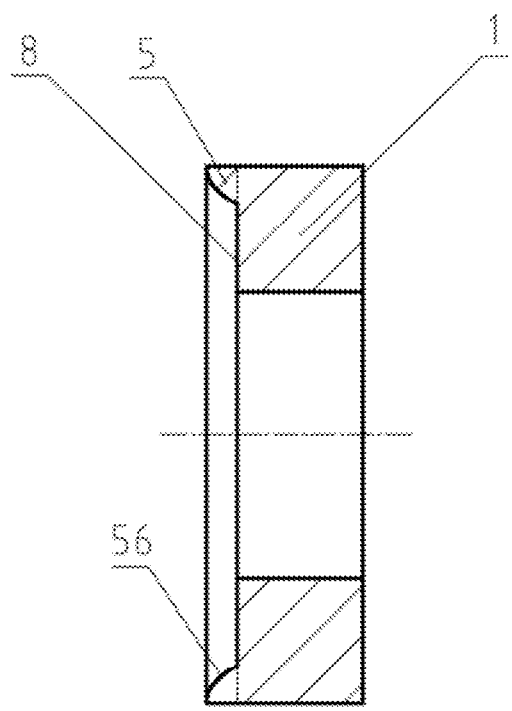
FIG. 8 is an axial sectional view of a moving ring of a large cross-section width according to Embodiment VI of the present invention.

As shown in FIG. 8, this embodiment differs from Embodiment I in that: in this embodiment, the forwardly inclined portion of the rim 5 is located at the periphery of the moving ring's seal end face 8; an inclined connecting line VI 56 between the inclined portion and the line perpendicular to the moving ring's seal end face 8 is a camber line; and the outer section of the forwardly inclined portion of the rim 5 is curved.

Embodiment VII

Figure 9:
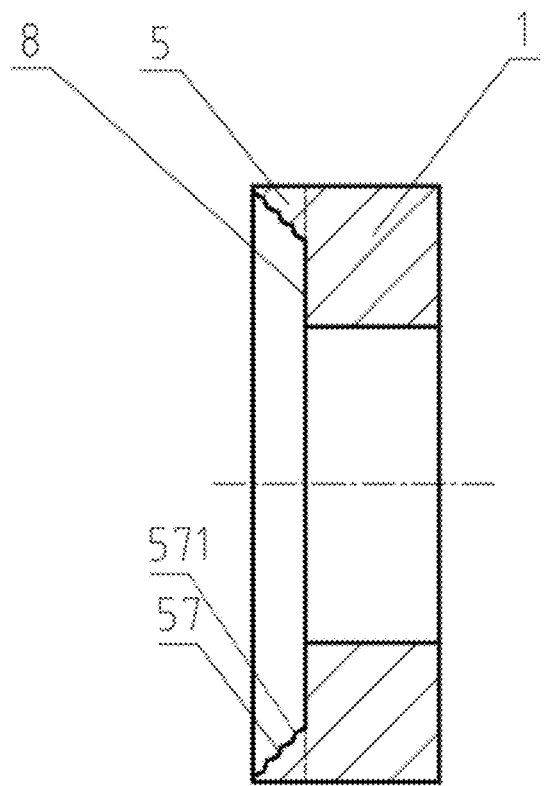
FIG. 9 is an axial sectional view of a moving ring of a large cross-section width according to Embodiment VII of the present invention.

As shown in FIG. 9, this embodiment differs from Embodiment I in that: in this embodiment, the forwardly inclined portion of the rim 5 is located at the periphery of the moving ring's seal end face 8; an inclined connecting line VII 57 between the inclined portion and the line perpendicular to the moving ring's seal end face 8 is a zigzag oblique line; the surface roughness of the inclined surface is greater than 1 mm; and the outer section of the forwardly inclined portion of the rim 5 is a combination of taper and polygon.

Embodiment VII differs from Embodiment 1 in that: in Embodiment VII, the inclined connecting line VII 57 of the rim 5 is not straight line, and is provided with further protrusions 571, and the protrusions 571 are circular arc or zigzag; in this way, the contact area of the rim 5 and the liquid can be increased, the rotating speed of liquid can be greatly improved, and the driving effect of the rim 5 to the non-liquid particles can be improved.

Embodiment VIII

Figure 10:
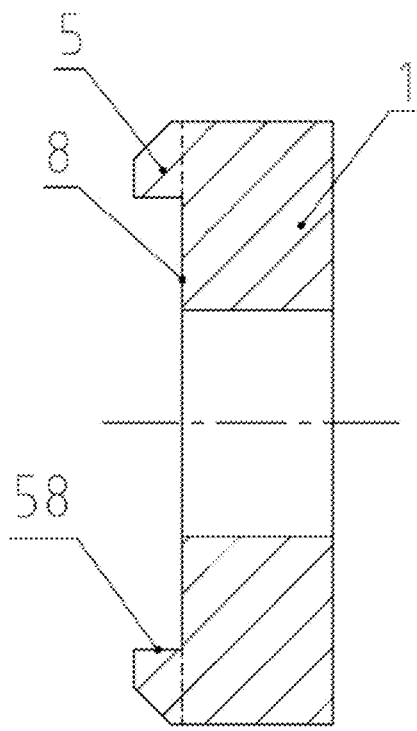
FIG. 10 is an axial sectional view of a moving ring of a large cross-section width according to Embodiment VIII of the present invention.
Figure 11:
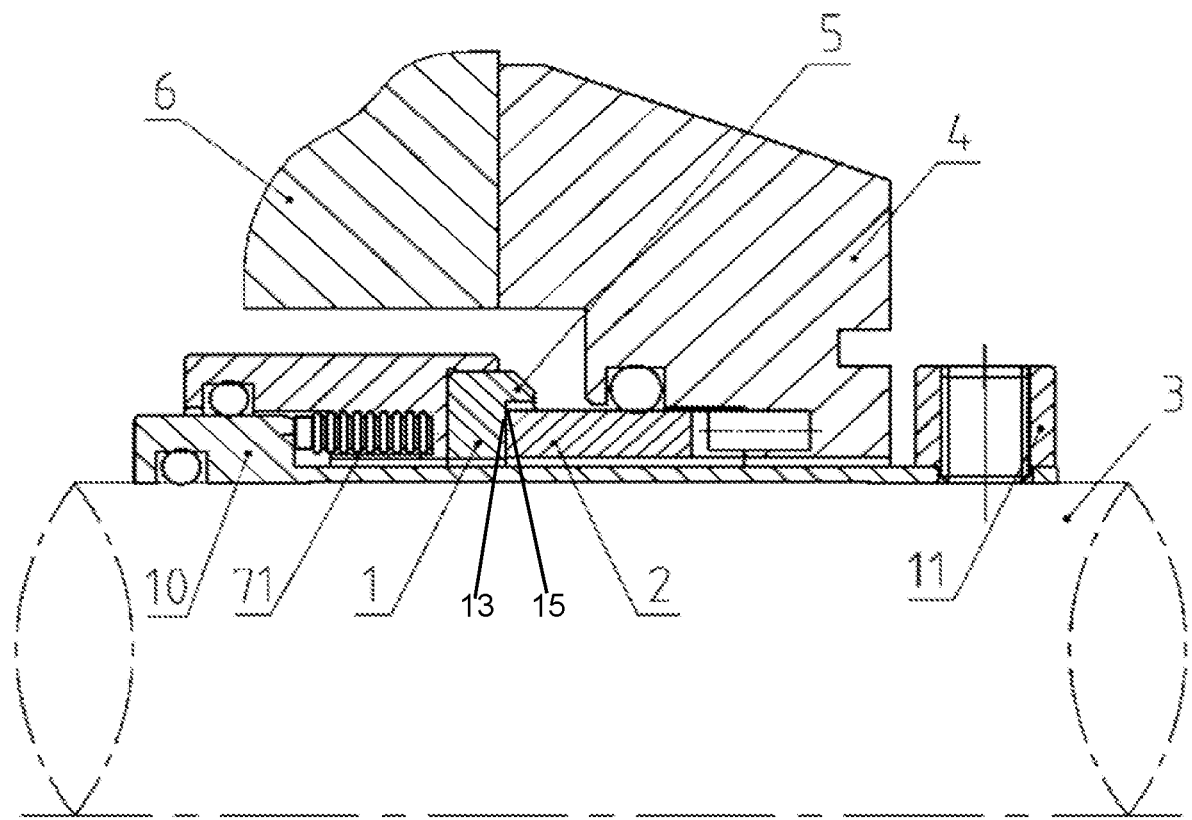
FIG. 11 is an axial sectional view of Embodiment VIII of the present invention in an integrated mechanical seal application.

As shown in FIGS. 10 and 11, this embodiment differs from Embodiment I in that: this embodiment discloses a mechanical seal with an outer forwardly-inclined rim for liquids, applied to integrated mechanical seal, including a moving ring 1 and a stationary ring 2, where the moving ring 1 or the stationary ring 2 is provided with a corrugated tube 71 along the axis direction, which enables seal end faces of the moving ring 1 and the stationary ring 2 to be fit to each other and perpendicular to a shaft 3; the moving ring 1 and the corrugated tube 71 are mounted on a shaft sleeve 10, and are fixedly connected to the shaft 3 by means of a locking ring 11; the stationary ring 2 and a press cover 4 are fixedly connected to a shell 6; the shaft 3 rotates relative to the shell 6; such setting can isolate liquid at one side of the seal end faces from leaking to the other side close to the shaft 3; a cross-section width of the moving ring 1 is greater than that of the stationary ring 2, so that the seal end face of the moving ring 1 is partially fit to the seal end face of the stationary ring 2; at one side of the seal end faces in contact with liquid, the moving ring 1 with a large cross-section width is provided with a rim 5 protruding in the radial direction, and the stationary ring 2 with a narrow cross-section is parallel to the axis, without protruding; the rim 5 is forwardly inclined towards the stationary ring 2 with a narrow cross-section width; the connection between the forwardly inclined portion and the fitting surface 13 of the moving ring 1 and the stationary ring 2 is a right angle connection; and the distance between the connection point 15 of the fitting surface 13 and the forwardly-inclined point of the rim 5 is greater than 0. Wherein, the corrugated tube 71 can also be replaced by the spring 7 shown in FIG. 1.

In this embodiment, the forwardly inclined portion of the rim 5 of the moving ring 1 is located at the periphery of the moving ring's seal end face 8; the forwardly inclined portion (the inner side of the rim 5) and the moving ring's seal end face 8 form a right angle; a right-angle connecting line VIII 58 is a straight line perpendicular to the moving ring's seal end face 8; and the outer section of the rim 5 is trapezoidal. In addition to the advantages recited in Embodiment I, the rim 5 in this embodiment can block large or weight impurity particles in the liquid from being accumulated at a point where the contact surface of the two rings is in contact with the media, and can drive the external liquid to eliminate lighter non-liquid particles.

The foregoing embodiments are merely preferred embodiments of the present invention for liquid diversity, particle impurity diversity and particle impurity content difference. It will be apparent to persons skilled in the art that various modifications and deformations may be further made without departing from the technical principle of the present invention, and should be considered to fall into the scope of protection of the present invention.

What is claimed is:

1. A mechanical seal for liquids, comprising: a moving ring and a stationary ring, wherein,
   the moving ring or the stationary ring is provided with a spring or a corrugated tube along a direction of an axis;
   an elastic force generated by the spring or the corrugated tube enables end faces of the moving ring and the stationary ring to be fit to each other and enables the end faces to be perpendicular to the axis;
   one side of a fitting surface of the moving ring and the stationary ring is air, and an opposing side is liquid;
   the moving ring and the stationary ring are closely fit to prevent the liquid from leaking from the opposing side to the one side;
   cross-section widths of the moving ring and the stationary ring are different, causing end portions of the moving ring and the stationary ring to be partially fit with each other;
   at one side of each of the moving ring and the stationary ring in contact with liquid, the moving ring comprises a large cross-section width with a rim protruding in its radial direction, and the stationary ring comprises a narrow cross-section width parallel to the axis, wherein the narrow cross-section width of the stationary ring is uniform without any protrusions; and
   the protruding rim of the moving ring comprising a forwardly inclined portion extending over a portion of the stationary ring with the narrow cross-section width, wherein the forwardly inclined portion extends from the end face of the stationary ring at the fitting surface of the moving ring and the stationary ring to a periphery of the fitting surface towards a top surface of the stationary ring, wherein the protruding rim at the periphery extends over a section of the top surface of the stationary ring.

2. The mechanical seal according to claim 1, wherein, the protruding rim is only disposed at an outer side of the fitting surface of the moving ring and the stationary ring.

3. The mechanical seal according to claim 1, wherein the protruding rim is only disposed at an inner side of the fitting surface of the moving ring and the stationary ring.

4. The mechanical seal according to claim 1, wherein the moving ring is an integrated structure or a split structure; and the stationary ring is an integrated structure or a split structure.

5. The mechanical seal according to claim 1, wherein, a surface of the forwardly inclined portion of the protruding rim close to the fitting surface is an arc-inclined, or oblique-inclined, or right-angle-forming surface.

6. The mechanical seal according to claim 2, wherein, a surface of the forwardly inclined portion of the protruding rim close to the fitting surface is an arc-inclined, or oblique-inclined, or right-angle-forming surface.

7. The mechanical seal according to claim 3, wherein, a surface of the forwardly inclined portion of the protruding rim close to the fitting surface is an arc-inclined, or oblique-inclined, or right-angle-forming surface.

8. The mechanical seal according to claim 4, wherein, a surface of the forwardly inclined portion of the protruding rim close to the fitting surface is an arc-inclined, or oblique-inclined, or right-angle-forming surface.

9. The mechanical seal according to claim 1, wherein, a connection point of the fitting surface and a point of the forwardly-inclined portion of the protruding rim are intersected with each other, or the distance therebetween is greater than 0.

10. The mechanical seal according to claim 2, wherein, a connection point of the fitting surface and a point of the forwardly-inclined portion of the protruding rim are intersected with each other, or the distance therebetween is greater than 0.

11. The mechanical seal according to claim 3, wherein, a connection point of the fitting surface and a point of the forwardly-inclined portion of the protruding rim are intersected with each other, or the distance therebetween is greater than 0.

12. The mechanical seal according to claim 1, wherein, an inclined surface of the protruding rim is provided with further protrusions.

13. The mechanical seal according to claim 2, wherein, an inclined surface of the protruding rim is provided with further protrusions.

14. The mechanical seal according to claim 3, wherein, an inclined surface of the rim is provided with further protrusions.

15. The mechanical seal according to claim 1, wherein, an outer section of the protruding rim is tapered, trapezoidal, polygonal, curved, or any combination thereof.

16. The mechanical seal according to claim 2, wherein, an outer section of the protruding rim is tapered, trapezoidal, polygonal, curved, or any combination thereof.

17. The mechanical seal according to claim 3, wherein, an outer section of the protruding rim is tapered, trapezoidal, polygonal, curved, or any combination thereof.

18. The mechanical seal according to claim 1, wherein, the material of the moving ring and the stationary ring is plastic, ceramic, graphite or metal alloy.

19. The mechanical seal according to claim 2, wherein, the material of the moving ring and the stationary ring is plastic, ceramic, graphite or metal alloy.

20. The mechanical seal according to claim 3, wherein, the material of the moving ring and the stationary ring is plastic, ceramic, graphite or metal alloy.

* * * * *